United States Patent [19]
Blanton et al.

[11] 3,899,895
[45] Aug. 19, 1975

[54] AUTOMATIC DEFROSTING CONTROL SYSTEM

[75] Inventors: Bobby D. Blanton, Hurst; Glen C. Shepherd, Garland, both of Tex.

[73] Assignee: Texas Instruments Incorporated, Dallas, Tex.

[22] Filed: Oct. 15, 1974

[21] Appl. No.: 514,864

[52] U.S. Cl. .................... 62/155; 62/80; 62/156; 62/158; 62/208; 62/234; 62/267
[51] Int. Cl. ............................................. F25d 21/06
[58] Field of Search ....... 62/80, 156, 155, 158, 208, 62/234, 267

[56] References Cited
UNITED STATES PATENTS

| | | | |
|---|---|---|---|
| 2,866,323 | 12/1958 | Candor | 62/155 |
| 2,907,180 | 10/1959 | Mann | 62/155 |
| 2,949,017 | 8/1960 | Swanson | 62/155 |
| 3,055,188 | 9/1962 | Syfert | 62/267 |
| 3,174,297 | 3/1965 | Kuhn | 62/156 |
| 3,203,195 | 8/1965 | Amentrout | 62/156 |
| 3,436,929 | 4/1969 | Harbour | 62/155 |
| 3,518,841 | 7/1970 | West | 62/155 |
| 3,826,103 | 7/1974 | Grover | 62/156 |

*Primary Examiner*—William J. Wye
*Attorney, Agent, or Firm*—James P. McAndrews; John A. Haug; Russell E. Baumann

[57] ABSTRACT

An automatic defrosting control system for a refrigeration system having an evaporator or the like for absorbing heat from a zone to be cooled to a predetermined temperature level and being subject to the accretion of frost thereon. The control system includes means for causing defrosting of the evaporator, a thermostat, a thermal time-delay relay and a heater. The thermostat is positioned in heat-exchange relation with both the evaporator and the defrosting means and is connected in a control circuit. The thermostat has a first switching position for terminating operation of the defrosting means and a second switching position for enabling operation thereof. It switches from its first to its second position in response to its temperature falling to a lower predetermined level and switches to its first position upon its temperature rising to a higher predetermined level. The thermal time-delay relay is positioned in heat-exchange relation with the evaporator and is also connected in the control circuit. It has a first switching position for permitting operation of the evaporator and a second switching position for energizing the defrosting means and preventing operation of the evaporator. The relay switches from its first to its second position in response to its temperature falling to a lower predetermined level and switches back to its first position in response to its temperature rising to a higher predetermined level. The heater is connected in the control circuit for energization during at least a portion of the period that the relay is in its second position thereby to heat the relay to its higher predetermined temperature level. When the temperature of the thermostat falls to its lower predetermined level and the relay cools to its lower predetermined temperature level, the thermostat and relay will switch to their second positions thereby initiating defrosting.

7 Claims, 6 Drawing Figures

AUTOMATIC DEFROSTING CONTROL SYSTEM

BACKGROUND OF THE INVENTION

This invention relates to a defrost system for various types of refrigeration apparatus and more particularly to an automatic defrost system which will operate when frost builds up on the cooling unit (e.g., the evaporator) of the refrigeration apparatus.

The accumulation or build-up of frost on the evaporator of a refrigerator or other refrigeration unit has long been a problem. Various automatic defrosting systems have been used and are well known in the art. Typically, an automatic defrost system is controlled by a clock timer which initiates operation of the defrost system at certain times of the day or after the compressor has run a predetermined length of time. The rate at which frost forms on the evaporator is a function of the amount of water vapor in the air passing over the evaporator, the greater the water content the faster the frost accumulates. In a refrigerator, the amount of water vapor within the air to be cooled depends a great deal on the ambient conditions (i.e., room temperature and relative humidity) outside the refrigerator because ambient air is introduced into the refrigerator each time the door is opened and closed, and water vapor sources (e.g., wet produce and open containers of liquids) within the refrigerator. With clock-controlled defrost systems and with a slow build-up of frost, operation of the defrost system is sometimes initiated before any significant amount of frost has built up on the evaporator, thus resulting in a wastage of power to defrost the refrigerator when it is not required and exposing the items in the refrigerator to unnecessary defrost cycles. On the other hand, under heavy frost conditions, excessive frost may build up on the evaporator between the timed defrost cycles, thus reducing the efficiency of the refrigerator, increasing the power consumed thereby and warming foodstuff that should be kept cool, resulting in shorter shelf-life for refrigerated foods and possible contamination unknown to the user.

Another defrosting system is one in which the number of door openings are counted and a defrosting cycle is initiated after a selected number of openings occur. This arrangement is disadvantageous in that an unused or little used refrigerator would not be defrosted even though a substantial frost deposit has built up. Also, mechanical counters are relatively unreliable in continued use. Depressed temperature systems have also been utilized where defrosting cycles are initiated when the evaporator reaches a temperature much lower than its normal operating temperature. This depressed evaporator temperature occurs after ice forms on the evaporator, reducing its efficiency. Depressed temperature systems have not been too successful because the low temperature varies from evaporator to evaporator due to production tolerances. Good sensing of the depressed temperature has been difficult due to inconsistency of heat transfer materials used between the evaporator and the sensing control. Depressed temperature systems have, as a rule, been more expensive than the systems in current usage.

Other systems utilized have been restricted air-flow methods with electronic sensors, but these are relatively expensive and difficult to build in production. Fluidic systems initiating defrost based on pressure changes in the refrigerating equipment are also expensive.

SUMMARY OF THE INVENTION

Among the several objects of this invention may be noted the provision of an automatic defrost system for refrigeration apparatus (e.g., a refrigerator, a freezer, a refrigerated vending machine, or an air conditioner) which eliminates the use of clocks or counter mechanisms; the provision of a demand defrost system which has no rotating parts, is easy and convenient to install or replace, and minimizes wiring expense; the provision of such a defrost system which is relatively simple and of economical construction and which will reliably operate regardless of ambient climatic conditions. Other objects and features will be in part apparent and in part pointed out hereinafter.

Briefly, an automatic defrosting control system of this invention comprises means for causing defrosting of the refrigeration system cooling means, a thermostat, a thermal time-delay relay and heating means for the relay. The thermostat is positioned in heat-exchange relation with both the cooling and the defrosting means and is connected in a control circuit for the refrigeration system. The thermostat has a first switching position for terminating operation of the defrosting means and a second switching position for enabling operation thereof. It switches from its first to its second position in response to its temperature falling to a lower predetermined level and switches to its first position in response to its temperature rising to a higher predetermined level. The thermal time-delay relay is positioned in heat-exchange relation with the cooling means and is connected in the control circuit. It has a first switching position for permitting operation of the cooling means and a second switching position for energizing the defrosting means and preventing operation of the cooling means. The relay switches from its first to its second position in response to its temperature falling to a lower predetermined level and switches back to its first position in response to its temperature rising to a higher predetermined level. The heating means is connected in the control circuit for energization during at least a portion of the period that the relay is in its second position thereby to heat the relay to its higher predetermined temperature level. Upon the temperature of the thermostat falling to its lower predetermined level and the relay cooling to its lower predetermined temperature level the thermostat and relay will both switch to their second positions thereby initiating defrosting.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 5:
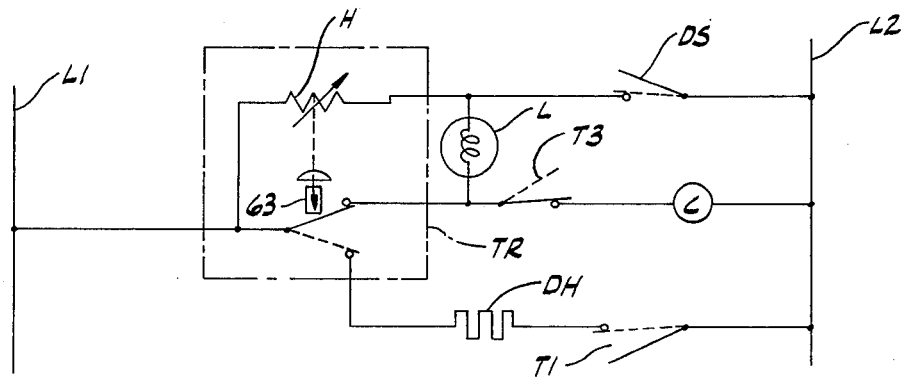
FIGS. 5 and 6 are schematic circuit diagrams of other embodiments of automatic defrost systems of this invention.

Referring now to the drawings, a defrost system of this invention, as indicated generally at 1, is shown installed in a conventional two-door refrigerator-freezer 3. The refrigerator-freezer includes a cabinet 5 having a top 7, side walls 9, a back wall 11, a bottom wall (not shown) and a partition 13 dividing the interior of the cabinet and defining a freezer compartment 15 and a food compartment 16, these compartments constituting refrigerated zones. A freezer door 17 and refrigerator door 19 close the front of the cabinet. The refrigerator includes a conventional refrigeration system including a compressor driven by an electric compressor motor C (see FIGS. 2, 5 and 6), a condenser (not shown) and a cooling unit or evaporator generally indicated at 23. The evaporator includes a plurality of refrigerant lines 25 constituting a coil, this coil being subject to frost build-up. A flow path generally indicated at 27 provides for the intake of air from both the freezer and food compartments, for the passage of this air over the evaporator for absorbing heat from the air and thus chilling the air, and for the discharge of the chilled air into the refrigerated compartments or zones. A blower or fan 29 is provided for forcing air through the flow path. While the defrost system of this invention is depicted as installed in a two-compartment refrigerator-freezer, it will be understood that it may be installed in other refrigeration apparatus, such as a single-compartment refrigerator, a freezer, a refrigerated vending machine, or an air conditioner.

More particularly, flow path 27 is, in part, defined by partition 13 and by a horizontal panel 31 in freezer compartment 15 spaced above the partition and thus forming a main passage 33 between the horizontal panel and the partition. An opening 35 is provided in partition 13 for the intake of air into the passage from food compartment 16 and an opening 37 is provided in panel 31 for the intake of air from the freezer compartment. Evaporator 23 is located within passage 33 for chilling air from the food and freezer compartments as it passes thereover. An inner vertical panel 39 is spaced from back wall 11, thereby to provide a return or outlet passage 41 for the discharge of chilled air into the food compartment via an outlet 43. A vertical wall 45 extends up from panel 31 and a fan shroud 47 is disposed between vertical wall 45 and panel 39, thereby to define a fan intake chamber 49 and a discharge chamber 51, with the upper end of the fan intake chamber being closed by a cap 53. An opening 55 in panel 31 provides communication between main passage 33 and the fan inlet chamber. A baffle 57 directs and divides the chilled air discharged from the fan into outlet passage 41 for discharge into the food compartment and into freezer compartment 15 via openings 58 and 59.

Figure 1:
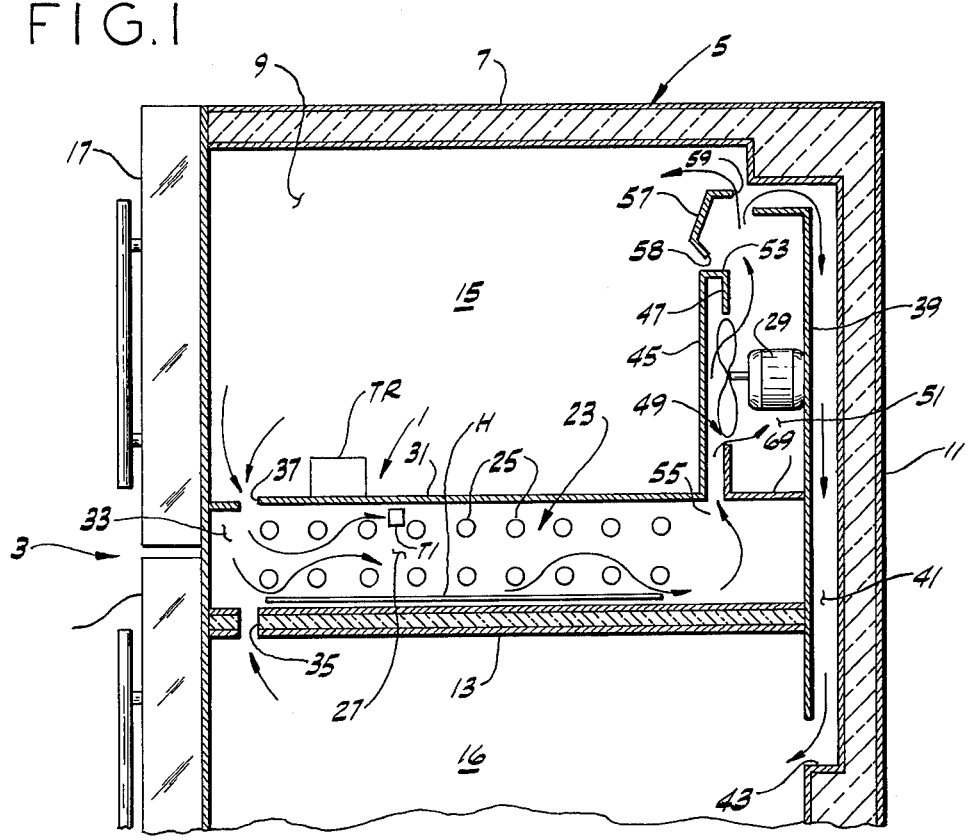
FIG. 1 is a view in section of refrigeration apparatus employing a defrost system of this invention and illustrating the normal flow of air therethrough when the refrigeration apparatus is in operation.

The defrost system 1 of this invention comprises a defrost termination thermostat T1 and a thermal time-delay relay TR, which function as a defrost initiation thermostat, both of which are connected in a circuit for controlling energization of a heater DH for melting and removal of frost from evaporator 23 upon build-up of frost thereon. T1, as indicated in FIG. 1, is positioned in heat-exchange relation with both the heater DH and the evaporator by being located on or adjacent a portion of the coils of evaporator 23 that is particularly prone to frosting or icing. TR is preferably mounted out of the air flow across the evaporator and is conveniently positioned within an insulated well in the side wall of the refrigerator. Thermostat T1 and relay TR have conventional temperature-responsive wide-differential switches, such as any of the widely used bi-metallic disk-actuated types in which the contacts are abruptly moved from one switching position to the other when heated and cooled.

Figure 2:
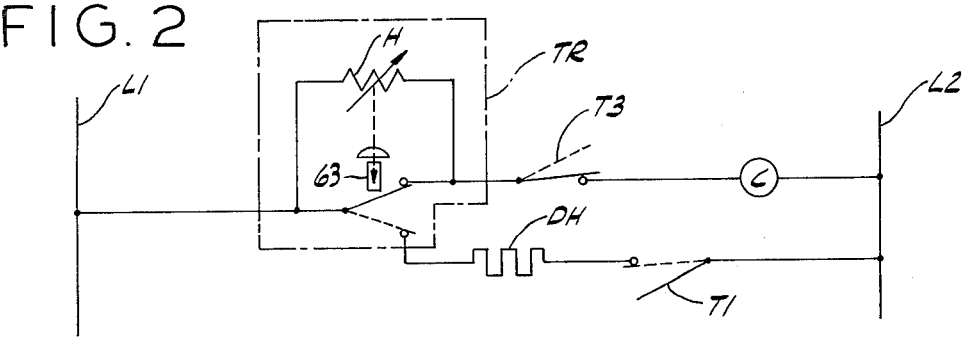
FIG. 2 is a circuit diagram of a defrost system of this invention.

Referring now to FIG. 2, thermostat T1 and relay TR are schematically shown connected in a control circuit for selectively energizing defrost heater DH and periodically actuating compressor motor C in response to the temperature sensed by a thermostat T3, a conventional adjustable cold control typically positioned in refrigerator food compartment 16. Included in the control circuit is a heater comprising a resistor H. Resistor H is preferably a self-regulating, self-heating positive temperature coefficient resistor which has a relatively low resistance when deenergized at ambient temperature but which will increase in resistance abruptly as its temperature rises above a given level. Heater H is positioned in close heat-exchange relation with the thermostatic switch mechanism of TR (as indicated by the dashed line therebetween indicating a thermal link) and is enclosed within the housing thereof.

Figure 3:
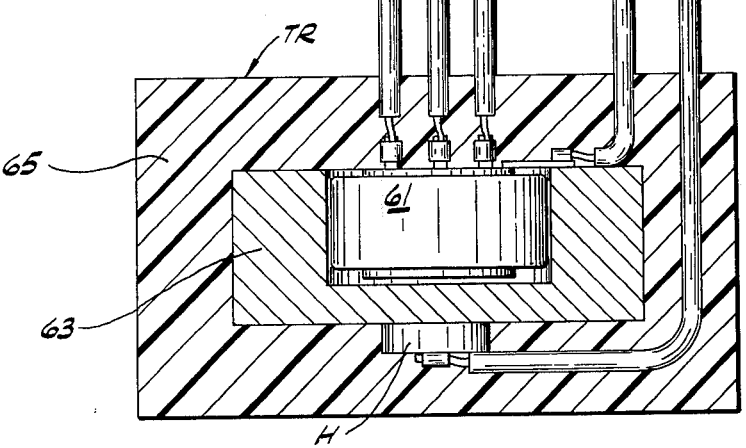
FIG. 3 is a view partially in section of a thermal time-delay relay component employed in the system of this invention.

FIG. 3 illustrates the physical arrangement of thermal relay TR with the single-pole double-throw switching components and the thermally responsive actuating disk being enclosed within a housing 61. PTC heater H is secured to one surface of a heat sink 63 of metal such as copper, which acts as a thermal reservoir or capacitor. Housing 61 is recessed into sink 63 for efficient heat transfer therebetween. Heater H, housing 61 and sink 63 are centrally positioned within a large block 65 of thermal insulation, such as foamed polyurethane or the like.

Thermostat T1 will move from a first (solid-line) switching position, in which defrost heater DH is disabled, to a second (broken-line) position when its temperature falls to a level of about 0°F., for example, and will not switch back to its first position until its temperature rises to say 65°F. Similarly TR will move from its first (solid-line) switching position, in which the compressor may be energized, to its second (broken-line) position, in which heater DH may be energized, only when its temperature falls to a low level in the order of 5°–10°F., remaining there until its temperature rises to a high level, e.g., 60°F., whereupon it abruptly reverts to its first position.

Figure 4:
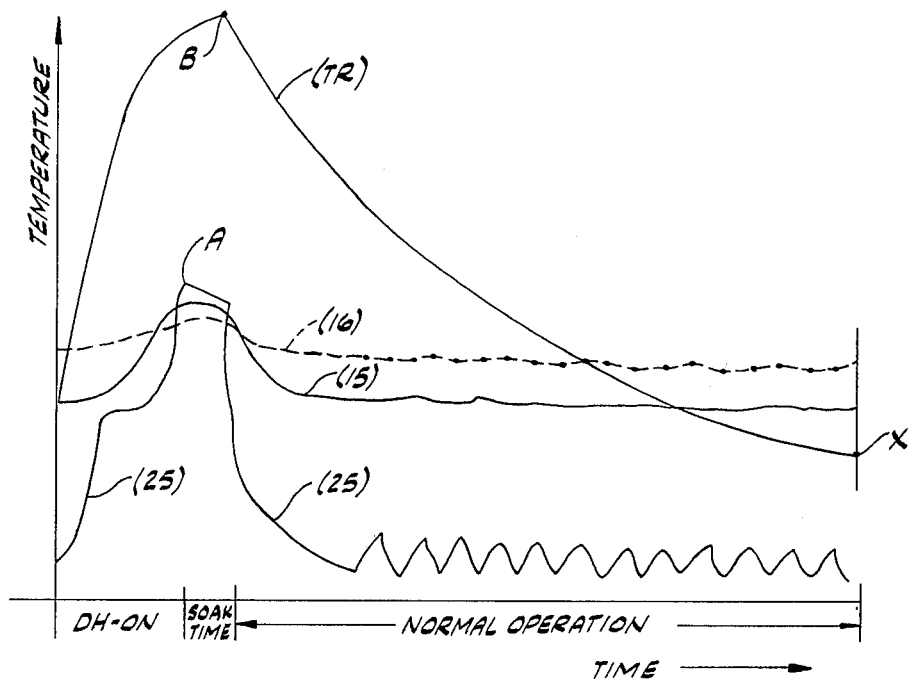
FIG. 4 is a graphical representation of the temperatures of various components of the refrigeration system, the thermostat and the thermal relay during operation beginning with the initiation of a defrosting period, through defrosting and subsequent normal operation and frost accumulation to the initiation of the next defrosting period.

FIG. 4 illustrates the temperatures of the various system components, each noted parenthetically in relation to its respective temperature curve, beginning with the initiation of a defrost mode. At that moment T3 will be closed (or will close shortly thereafter as the food compartment warms), TR will have just switched to its second or broken-line position, and T1 will be in its broken-line position so that heater DH has just been energized. The temperatures of evaporator tubing 25 and in the freezer and food compartments will increase as indicated from the heat supplied by DH. Heater H has been deenergized during normal predefrosting operation as TR was in its solid-line position thereby shunting H and permitting TR to cool. However, heater H is reenergized as TR switches to its brokenline position (assuming T3 is closed) and rapidly (because of the fast heating characteristics of PTC's) heats it as indicated in the left portion of FIG. 4. T1 will also be heated by DH until T1's temperature rises to 65°F., whereupon, as indicated at A, T1 will switch back to its solid-line position and thereby terminate the defrost period. TR, because of its thermal mass or inertia and the quantum of heat supplied by H, will take longer to heat to 60°F. This allows a short period of additional time after heater DH is deenergized for a "soak" period, during which the melted frost drains from the evaporator, before TR switches to its solid-line position as indicated at B and permits reenergization of compressor C.

Heater H is thereby shunted and deenergized and pull-down follows until the freezer and food compartments are sufficiently cool for cold control T3 to open and for the refrigerator to operate normally. The normal operational mode will continue with each indicated "on" mode of the compressor causing the illustrated temperature decreases in coils 25 and with relay TR gradually cooling. Under typical circumstances this will require at least six to eight hours before TR cools to its lower temperature of 5°–10°F. and TR switches to its broken-line position. By this time T1 will be cooling during compressor "on" modes so that it will have switched to its second position thereby enabling energization of defrost heater DH when TR switches to its second position to initiate the next defrosting cycle as indicated at X. It should be understood that the curves of FIG. 4 are merely representative or illustrative and that more "on" and "off" cycles of the compressor could take place between a termination of one defrost mode and the initiation of the next one.

It will be noted that the particular switching temperatures referred to above are merely illustrative and they may be varied widely within the broad limits.

Another embodiment of the present invention is schematically illustrated in FIG. 4 which further includes a conventional normally-open refrigerator-door switch DS and interior lamp L connected in the control circuit as indicated. Operation is substantially the same as that of FIG. 2 described above except that heater H is energized each time the refrigerator door is opened and for the duration of each opening. Thus TR will be reheated during these periods and will prevent initiation of a defrosting cycle during door usage periods. This will delay initiation of defrosting until one to two hours after the last door opening even though the compressor C may be in a 100% run condition. Thus, defrosting will occur during low usage periods, such as at night.

Figure 6:
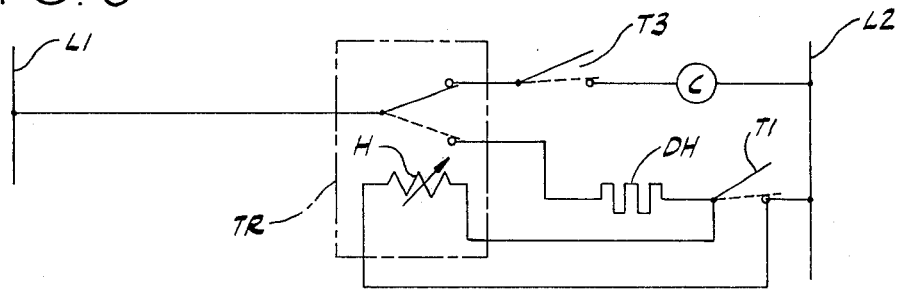

The alternate embodiment of FIG. 6 also operates in a fashion similar to that of FIG. 2, but differs in shunt-connecting PTC heater H across the contacts of termination thermostat T1 rather than across TR's contacts. In this embodiment PTC heater H will only be energized after T1 has heated to its 65°F. level to terminate the defrosting cycle and assumes its first position. Heater H will be energized through the low resistance of DH and TR in its second position until TR's temperature rises to 60°F. whereupon TR switches to its first solid-line position to begin pull-down and subsequent normal operation during which H is deenergized and TR cools slowly.

It will be understood that the parameters and stabilization temperature of PTC heater H and the mass of the heat sink 63 may be varied to provide the desired cooling gradient.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An automatic defrosting control system for a refrigeration system having cooling means for absorbing heat from a zone to be cooled to a predetermined temperature level, said cooling means being subject to the accretion of frost thereon, said control system comprising:

means for causing defrosting of said cooling means;
a thermostat adapted to be positioned in heat-exchange relation with both said cooling means and said defrosting means and adapted for connection in a control circuit for said refrigeration system and having a first switching position for terminating operation of said defrosting means and a second switching position for enabling operation thereof, said thermostat switching from its first to its second position in response to its temperature falling to a lower predetermined level and switching to its first position in response to its temperature rising to a higher predetermined level;
a thermal time-delay relay adapted to be positioned in heat-exchange relation with said cooling means and adapted for connection in said control circuit and having a first switching position for permitting operation of said cooling means and a second switching position for energizing said defrosting means and preventing operation of said cooling means, said relay switching from its first switching position to its second position in response to its temperature falling to a lower predetermined level and switching to its first position in response to its temperature rising to a higher predetermined level; and
heating means adapted for connection in said control circuit for energization during at least a portion of the period that said relay is in its second position thereby to heat said relay to its higher predetermined temperature level whereby upon the temperature of said thermostat falling to its lower predetermined level and said relay cooling to its lower predetermined temperature level said thermostat and relay will switch to their second positions thereby initiating defrosting.

2. A system as set forth in claim 1 wherein said heating means comprises a self-regulating self-heating positive temperature coefficient resistor having a relatively low initial resistance which increases abruptly as its temperature rises above a given level.

3. A system as set forth in claim 1 wherein said heating means is an electric resistance heater parallel-connected across said relay thereby to be shunted and deenergized when said relay is in its first position.

4. A system as set forth in claim 1 wherein said refrigeration system includes a door for access to the cooled zone and a door-operated switch connected in said circuit for energizing said heating means during the time periods said door remains open.

5. A system as set forth in claim 1 wherein the thermostat is a single-pole single-throw switch and is open in its first position and closed in its second position.

6. A system as set forth in claim 5 wherein the heating means is an electrical resistance heater shunt-connected across said thermostat whereby the heating means is only energized during the period when the thermostat is in its first position and the relay is in its second switching position.

7. A system as set forth in claim 1 wherein the thermal time-delay relay comprises a thermostatic switch having first and second switching positions, heat-responsive means for actuating said switch to its first position in response to a temperature rise to a first predetermined level and moving said switch to its second predetermined level, a thermal reservoir in heat-exchange relation with said heat-responsive actuating means, a positive temperature coefficient electrical resistance heater in heat-exchange relation with said thermal reservoir for effecting rapid heating thereof to the first temperature level, and a thermally insulating housing enclosing the switch, actuating means, thermal reservoir and heater whereby the time required for heating said means from its second temperature level to its first temperature level is much less than the time required for the temperature of said actuating means to fall from the first level to the second level.

* * * * *